3,078,245
FLUOROCARBON VINYL ETHERS AND POLYMERS AND AQUEOUS DISPERSIONS CONTAINING SAME
Richard F. Heine, White Bear Lake, Minn., assignor to Minnesota Mining and Manufacturing Company, St. Paul, Minn., a corporation of Delaware
No Drawing. Filed Nov. 7, 1960, Ser. No. 67,507
18 Claims. (Cl. 260—29.6)

This invention relates to a new and useful class of fluorinated vinyl ethers and polymers thereof. In one aspect the invention relates to the sizing of fabrics to impart both repellency to water and resistance to absorption and soiling by oily and greasy materials, to the coating and impregnating of matrices, such as paper and leather, and for other purposes.

The novel fluorocarbon vinyl ethers of this invention are perfluoroalkanesulfonamido, including perfluorocycloalkanesulfonamido, alkyl vinyl ethers of the formula $R_fSO_2N(R)R'OCH=CH_2$ wherein R is hydrogen, or an alkyl group having from 1 to about 12 carbon atoms, preferably from 1 to 4 carbon atom, $R_f$ is aliphatic $C_nF_{2n+1}$ or cycloaliphatic $C_nF_{2n-1}$, n is an integer from 1 to 18, preferably from 3 to 12, and R' is an alkylene bridging group having from 1 to 12, preferably from 1 to 8, carbon atoms. R' can be branched or straight chain. Illustrative of these compounds are: perfluoroethanesulfonamidoethyl vinyl ether, perfluorooctanesulfonamidoethyl vinyl ether, perfluorododecanesulfonamidoethyl vinyl ether, N-propyl perfluorooctanesulfonamidoethyl vinyl ether, N-ethyl perfluorooctanesulfonamidoethyl vinyl ether, N-hexadecyl perfluorooctanesulfonamidoethyl vinyl ether, N-propyl perfluorooctanesulfonamidooctyl vinyl ether, N-ethyl perfluorocyclohexylethanesulfonamidoethyl vinyl ether, N-cyclohexyl perfluorobutylcyclohexanesulfonamidoethyl vinyl ether, N-benzyl perfluorooctanesulfonamidoethyl vinyl ether, N-phenethyl perfluorocyclohexanesulfonamidomethyl vinyl ether, etc. The perfluoroalkane radical ($R_f$) may be cyclic as well as branched and straight chain.

These compounds are reactive monomers and can be polymerized to yield homopolymers as well as copolymers with another polymerizable ethylenically unsaturated monomer, particularly the polymerizable vinyl compounds capable of vinyl addition reactions. Examples are isobutylene, acrylonitrile, vinyl acetate, vinyl ethers, methyl acrylate, vinylidene chloride, vinyl chloride, vinyl fluoride, vinylidene fluoride, trifluorochlorethylene, maleic anhydride, perfluoropropene, and tetrafluoroethylene, including both halogenated and unhalogenated varieties. Fluorocarbon vinyl esters, methacrylates, acrylates and the fluorinated monoolefins having from 2–3 carbon atoms are particularly preferred as comonomers. Vulcanizable copolymers can be made. Since the side chains can vary as to length and to chemical type, the production of various polymers having different physical properties is possible, including high molecular weight elastomers and thermoplastics and also lower molecular weight oils, greases and waxes. The use of chain terminating agents to regulate molecular weight of polymers is known.

The perfluoroalkanesulfonamido alkyl vinyl ethers of this invention are prepared by reacting the sodium salt of a perfluoroalkanesulfonamide, e.g. as described in U.S. Patent 2,732,398, with a chloroalkyl vinyl ether in a solvent such as ethylene glycol, acetone, or dimethyl formamide, according to the following equation:

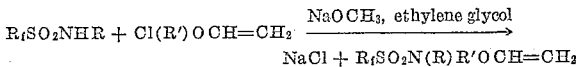

with $R_f$, R' and R as defined earlier. This procedure can be illustrated by the preparation of N-propyl-perfluorooctanesulfonamidoethyl vinyl ether.

The sodium salt of N-propyl perfluorooctanesulfonamide was prepared by admixing equimolar amounts of N-propyl perfluorooctanesulfonamide and sodium methoxide in methanol and maintaining the mixture under vacuum at a temperature of 100° C. for one hour. The excess methanol was removed. To 10 parts by weight of ethylene glycol and 2.4 parts by weight of freshly distilled 2-chloroethyl vinyl ether was added 10.8 parts by weight of the above sodium salt. The mixture was stirred and heated at 120° C. for six hours. If desired, a small amount of sodium carbonate (e.g. 2 parts by weight) may be added to promote the reaction. After cooling the reaction mixture two phases formed. The lower phase was washed once with water, then distilled. Four parts by weight of a liquid boiling at 110–115° C. at 0.15 mm. and having a $n_D^{27}$ of 1.3680 was recovered. Analysis indicated: 29.5% C (29.3% C theoretical) and 2.29% N (2.29% N theoretical), 2-(N-propyl perfluorooctanesulfonamido) ethyl vinyl ether.

Other N-substituted perfluoroalkanesulfonamides can be prepared by reacting various perfluoroalkanesulfonyl fluorides, which are disclosed in U.S. Patent 2,732,398, with diverse amines. Some of these perfluoroalkanesulfonamides, the sodium salts of which are employed in the procedure set forth hereinabove are, for example, N-methyl perfluorooctanesulfonamide, N-isopropyl perfluorooctanesulfonamide, N-ethyl perfluorododecanesulfonamide, perfluorodecanesulfonamide.

A second method for the preparation of these perfluoroalkanesulfonamido alkyl vinyl ethers involves the reaction of a perfluoroalkyl sulfonyl fluoride with an aminoalkyl vinyl ether, preferably a beta to omega substituted aminoalkyl vinyl ether, as illustrated by the following equation:

$$R_fSO_2F + 2H_2N(R')OCH=CH_2 \rightarrow$$
$$R_fSO_2NHR'OCH=CH_2 + CH_2=CHOR'NH_2 \cdot HF$$

with $R_f$ and R' as defined earlier. This procedure can be illustrated by the preparation of perfluorooctanesulfonamidoethyl vinyl ether.

Perfluorooctanesulfonyl fluoride, 25 parts by weight, was added slowly and with stirring to 13 parts of 2-aminoethyl vinyl ether in 100 parts of diisopropyl ether, with the temperature maintained below 40–45° C. After 6–8 hours the amine hydrofluoride was removed by water washing and the ether was removed under vacuum. The residue or product was recrystallized from a 3:1 mixture of methylchoroform:acetone to yield 8.6 parts of perfluorooctanesulfonamidoethyl vinyl ether, M.P. 125° C.

The effect of the fluorocarbon "tail," particularly when containing 3 or more perfluorinated carbon atoms, is to impart distinctive properties of oil and water repellency to the reaction products thereof. The ethylenic bond provides a point of attack for chemical reactions, and various derivatives may be made through addition at the double bond, e.g. addition of alcohols, bromine, chlorine, HCl, HBr, mercaptan acetic acid etc.

The present perfluoroalkanesulfonamidoalkyl vinyl ethers polymerize inter se to form novel homopolymers containing a multiplicity of ether units, each of which correspond to the following formula

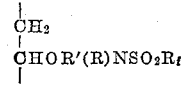

where $R_f$, R' and R are as defined earlier. Such polymers have a molecular structure comprising a skeletal linear hydrocarbon chain to which a multiplicity of saturated perfluoroalkanesulfonamidoalkyl chains are appended, each of which contains an —$SO_2NR$— radical separating a terminal perfluoroalkane group and a bridging alkylenoxy group. By varying the length of the perfluoroalkane group and the alkylenoxy group, polymers with a wide range of useful properties can be obtained and can be "tailored" for specific applications, e.g. adhesives, resins, rubbers, leather treatment, lubricants, flame resistant coatings, gaskets, polishes, impregnated or coated papers, treated textiles, etc.

Copolymers formed from mixtures of two or more different perfluoroalkanesulfonamido alkyl vinyl ethers can be made, in which case recurring units with different side chains are provided. Copolymers formed from mixtures of one or more perfluoroalkanesulfonamido alkyl vinyl ethers and another polymerizable monomer or monomers can also be prepared, as mentioned earlier. Bulk, solution, emulsion and suspension polymerization procedures can be utilized, see Vinyl and Related Polymers, C. E. Schildknecht, John Wiley & Sons, Inc., New York (1952) pp. 593–634, particularly with the use of Lewis acid catalysts and free radical polymerization promoters.

The perfluoroalkanesulfonamidoalkyl vinyl ether polymers of this invention are resistant to hydrolysis or loss of the perfluoroalkyl group, even when in contact with fatty oils at elevated temperatures. This is particularly important when such polymers come into contact with foodstuff, as is the case when they are used to treat packaging materials, and is in contrast to polymers which contain relatively easily hydrolyzable vinyl ester groups. Various fabrics, synthetic and natural, as well as paper, leather and diverse other products, may be rendered both oil and water repellent with these polymers, using known techniques, e.g. spraying, roll coating, brushing, padding, dipping, etc.

The properties of the polymer masses can also be varied by the use of plasticizers and solvents and by compounding with such materials as carbon black silica, asbestos, glass fibers, colorants, dyes, and other finely divided solid materials such as powdered metals and oxides, e.g. aluminum powder and zinc oxide. The stiffness or hardness of the polymer mass can be increased by including a small proportion of a polyfunctional compound at the time of polymerization to cause crosslinking between the skeletal chains and thereby form a three-dimensional network. It is frequently desirable to blend other polymers, e.g. epoxides, phenolic resins, polyvinyl chloride, polytetrafluoroethylene, halogenated and unhalogenated vinyl and butadiene rubbers, polyesters, polymers of azirane ring containing compounds (e.g. tris-aziridinyl phophine oxide) etc. with the polymers of this invention, both as a solid blend and as a latex blend. The use of various other expedients for modifying the properties of the polymers of this invention for a particular application will be understood by those skilled in the art and need not be further elaborated upon.

EXAMPLE 1

This example illustrates the homopolymerization of the perfluorooctanesulfonamidoalkyl vinyl ethers of this invention.

The following charge was made into a glass ampoule:

2.0 grams 2-(N-propyl perfluorooctanesulfonamide) ethyl vinyl ether
4.0 grams distilled xylene hexafluoride
2 drops 47% $BF_3 \cdot (C_2H_5)_2O$ The $BF_3 \cdot (C_2H_5)_2O$ was added to the frozen monomer solution (cooled in liquid air). The ampoule was frozen, evacuated, sealed and placed in a −78° C. bath. The bath was allowed to warm slowly to room temperature and was maintained at room temperature for 3 hours. As the solution thawed it became viscous and a dark green color appeared, finally turning brown. The ampoule was then opened and the contents were poured into methanol containing a small amount of ammonia. A brown, viscous low molecular weight polymer layer separated and was recovered. The brown homopolymer was insoluble in acetone.

EXAMPLE 2

This example illustrates the copolymerization of a perfluoroalkanesulfonamidoalkyl vinyl ether and a fluorinated acrylate.

The following recipe was charged to a polymerization tube, after which the tube was sealed and tumbled in a 50% C. water bath:

|  | Parts by weight |
|---|---|
| Monomers | 100 |
| Water | 126 |
| Acetone | 54 |
| $C_8F_{17}SO_2NHC_3H_6N(CH_3)_2 \cdot HCl$ | 5 |
| $K_2S_2O_8$ | 0.2 |

The monomer charge consisted of 50 weight percent of 2-(N-ethyl perfluorooctanesulfonamido) ethyl vinyl ether and 50 weight percent of 2-(N-propyl perfluorooctanesulfonamido) ethyl acrylate. After about 18 hours the tube was removed from the bath, and a stable, clear blue latex was observed. The coagulated copolymer was a clear flexible plastic.

EXAMPLE 3

This example illustrates the copolymerization of the perfluoroalkanesulfonamidoalkyl vinyl ethers of this invention with octadecyl acrylate.

The following recipe was charged to a polymerization tube, after which the tube was sealed and placed in a 50° C. water bath:

|  | Parts by weight |
|---|---|
| Monomers | 100 |
| Water | 126 |
| Acetone | 54 |
| $C_8F_{17}SO_2NHC_3H_6N(CH_3)_2 \cdot HCl$ | 5 |
| $K_2S_2O_8$ | 0.2 |

The monomer charge consisted of 50 weight percent of 2-(N-ethyl perfluorooctanesulfonamido) ethyl vinyl ether and 50 weight percent of octadecyl acrylate. After about 18 hours of agitation at 50° C. a cloudy latex was observed. The coagulated copolymer was a somewhat brittle plastic.

EXAMPLE 4

This example illustrates the copolymerization of the perfluoroalkanesulfonamidoalkyl vinyl ethers with n-decyl acrylate.

The following recipe was charged to a polymerization ampoule, after which the ampoule was evacuated, sealed and tumbled in a water bath at 50° C.

|  | Parts by weight |
|---|---|
| 2 - N - propyl perfluorooctanesulfonamido) ethyl vinyl ether | 50 |
| Decyl acrylate | 50 |
| Water | 126 |
| Acetone | 54 |
| $C_8F_{17}SO_2NHC_3H_6N(CH_3)_2 \cdot HCl$ | 5 |
| Potassium persulfate | 0.2 |

After 15 hours the ampoule was removed from the water bath and the stable, cloudy latex was coagulated. The precipitated copolymer (67 parts by weight) was a tacky rubber.

EXAMPLE 5

This example illustrates the copolymerization of the perfluoroalkanesulfonamidoalkyl vinyl ethers with ethyl acrylate.

The following recipe was charged to a polymerization tube, after which the tube was evacuated, sealed and tumbled in a water bath at 50° C.

| | Parts by weight |
|---|---|
| 2 - (N - propyl perfluorooctanesulfonamido) ethyl vinyl ether | 50 |
| Ethyl acrylate | 50 |
| Water | 126 |
| Acetone | 54 |
| $C_8F_{17}SO_2NHC_3H_6N(CH_3)_2 \cdot HCl$ | 5 |
| Potassium persulfate | 0.2 |

After 15 hours the ampoule was removed from the water bath and the stable, milky latex was coagulated. The precipitated copolymer (59.8 parts by weight) was a non-tacky rubber.

Examples 6 and 7 illustrate the copolymerization of the perfluoroalkanesulfonamidoalkyl vinyl ethers with a fluorinated and a chlorofluorinated vinyl compound respectively. Other polymerizable vinyl compounds, as mentioned earlier, can also be employed as comonomers.

EXAMPLE 6

To a polymerization ampoule was charged:

| | |
|---|---|
| 2 - (N - propyl perfluorooctanesulfonamido) ethyl vinyl ether | 8.4 |
| 5% aqueous solution of "Brij 35" (a reaction product of ethylene oxide and $C_{11}H_{23}CH_2OH$, Atlas Co.) | 5.0 |
| Dioxane | 6.3 |
| 5% aqueous solution of potassium acid phosphate | 1.0 |
| 5% aqueous solution of ammonium persulfate | 1.0 |
| Perfluoropropene | 1.6 |
| Distilled water | 5.0 |

The ampoule was charged with all materials and then evacuated while the contents were frozen. The ampoule was maintained at 50° C. for 20 hours, and a clear, stable latex, together with 9.4 parts of coagulum, was found. Overall conversion to the copolymer was 89%. A portion of the latex was coagulated, and a clear soft copolymer film was prepared.

EXAMPLE 7

To a polymerization ampoule was charged:

| | |
|---|---|
| 2 - (N - propyl perfluorooctanesulfonamido) ethyl vinyl ether | 84 |
| Acetone | 45 |
| $(NH_4)_2S_2O_8$ | 0.5 |
| LiOH | 1.0 |
| $Cl(CF_2CFCl)_3CF_2COOK$ | 4.7 |
| Chlorotrifluoroethylene | 16 |
| Distilled water | 135 |

The ampoule thus charged was maintained at 50° C. for about 15½ hours, and a stable milky latex together with coagulum was formed. Over all conversion to the copolymer was 88%. A portion of the copolymeric latex was coagulated and produced a clear film which was brittle at room temperature and softened at body temperature.

EXAMPLE 8

The following example will illustrate the use of the copolymers of this invention in textile treatment.

The stable latex of Example 4 was diluted with water to a 0.5% solids concentration, then applied to woolen textile fabrics by the well known padding technique. The AATCC Spray Test 22-1952 was used to measure water repellency. Since there is no standard test for the measurement of oil repellency of fabrics, the following empirical test, which has been found to yield significant and reproducible results, was employed.

The oil repellency test is based on the different penetrating properties of two hydrocarbon liquids, i.e. mineral oil ("Nujol") and n-heptane. Mixtures of these two liquids are miscible in all proportions and show penetrating properties proportional to the n-heptane content of the mixture. The oil repellency numbers were selected to correspond to the AATCC Standard Spray Ratings (AATCC 22-1952), which measure water repellency. The technique for measuring oil repellency is as follows:

Swatches (8 inch by 8 inch) of the treated fabric are placed on a flat table. Test mixtures of various concentrations of n-heptane and mineral oil are contained in small dropping bottles. A drop of each mixture is gently placed, not dropped, onto the fabric surface, preferably in two different portions of the test swatch. After the drops have been allowed to stand undisturbed for three minutes, the fabric appearance is observed through the oil drop. Penetration or wetting, as evidenced by darkening, is noted. The number of the mixture containing the highest proportion of n-heptane, which does not penetrate or wet the fabric after three minutes contact is called the oil repellency of the specimen. The division between failure or resistance of successive test mixtures is generally quite sharp, presenting little problem in determining the break point. The following test mixtures are employed, the higher rating being the more oil repellent.

| Oil Repellency Rating | Vol. Percent Heptane | Vol. Percent Mineral Oil |
|---|---|---|
| 100+ | 60 | 40. |
| 100 | 50 | 50. |
| 90 | 40 | 60. |
| 80 | 30 | 70. |
| 70 | 20 | 80. |
| 50 | 0 | 100. |
| 0 | | no holdout to mineral oil. |

The test results indicated superior oil and water repellency on wool gabardine, Dacron worsted, tropical and worsted wool flannel fabric.

EXAMPLE 9

This example indicates the use of the copolymers of this invention in paper treatment.

The stable latex of Example 6 was diluted with water to 1% solids concentration. Kraft paper was treated with various concentrations of this copolymeric latex. Pickup was assumed to be 100%, and samples were dried at 230° F. To determine oil repellency of both creased and uncreased samples SAE 10 oil at 80° F. was applied to the surface of the specimens, and the underside of the specimens was observed for penetration. The time required for oil penetration represents a measure of oil repellency. As indicated in Table I, the resistance to oil penetration of the treated paper was excellent.

*Table I*

| Solids concentration | Uncreased, days | Creased, days |
|---|---|---|
| 0.3% | 40+ | 5-20 |
| 0.2% | 40+ | 3-5 |
| 0.1% | 15 | 2 |

Various other embodiments and modifications will become apparent to those skilled in the art without departing from the scope or spirit of this invention.

I claim:
1. A fluorinated vinyl ether having the formula

$$R_fSO_2N(R)R'OCH=CH_2$$

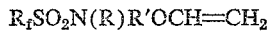

wherein $R_f$ is selected from the group consisting of aliphatic $C_nF_{2n+1}$ and cycloaliphatic $C_nF_{2n-1}$, R is selected from the group consisting of hydrogen and an alkyl group having from 1 to about 12 carbon atoms, $n$ is an integer from 1 to 18, and R' is an alkylene bridging group having from 1 to 12 carbon atoms.

2. Polymers having a skeletal chain containing fluorocarbon vinyl ether units of the formula $$R_fSO_2N(R)R'OCH$$
$$\phantom{R_fSO_2N(R)R'O}|$$
$$\phantom{R_fSO_2N(R)R'O}CH_2$$

wherein $R_f$ is selected from the group consisting of aliphatic $C_nF_{2n+1}$ and cycloaliphatic $C_nF_{2n-1}$, R is selected from the group consisting of hydrogen and an alkyl group having from 1 to about 12 carbon atoms, $n$ is an integer from 1 to 18, and R' is an alkylene bridging group having from 1 to 12 carbon atoms.

3. Stable aqueous latices of the polymers of claim 2.
4. Homopolymers of the fluorinated vinyl ether of claim 1.
5. Interpolymers of the fluorinated vinyl ether of claim 1 and at least one polymerizable ethylenically unsaturated compound.
6. Interpolymers of the fluorinated vinyl ether of claim 1 and another polymerizable vinyl compound.
7. Interpolymers of the fluorinated vinyl ether of claim 1 and a polymerizable acrylate ester.
8. Interpolymers of the fluorinated vinyl ether of claim 1 and a halogenated monoolefin having from 2 to 3 carbon atoms.
9. Interpolymers of the fluorinated vinyl ether of claim 1 and perfluoropropene.
10. Interpolymers of the fluorinated vinyl ether of claim 1 and trifluorochloroethylene.
11. Interpolymers of the fluorinated vinyl ether of claim 1 and tetrafluoroethylene.
12. Articles coated with the polymers of claim 2.
13. Paper impregnated with the polymers of claim 2.
14. Textiles sized with the polymers of claim 2.
15. The fluorinated vinyl ether of claim 1 wherein R is hydrogen.
16. The fluorinated vinyl ether of claim 1 wherein R is an alkyl group having from 1 to 4 carbon atoms.
17. The polymers of claim 2 wherein R is hydrogen.
18. The polymers of claim 2 wherein R is an alkyl group having from 1 to 4 carbon atoms.

References Cited in the file of this patent
UNITED STATES PATENTS

| | | |
|---|---|---|
| 2,803,656 | Ahlbrecht et al. | Aug. 20, 1957 |
| 2,841,573 | Ahlbrecht et al. | July 1, 1958 |
| 2,995,542 | Brown | Aug. 8, 1961 |